US012703887B2

(12) United States Patent
Beltrán Aznar

(10) Patent No.: US 12,703,887 B2
(45) Date of Patent: Aug. 11, 2026

(54) METHOD FOR THE ANTIMICROBIAL PROTECTION OF HIDES DURING THE TANNING PROCESS WHICH INCLUDES A BIOCIDAL COMPOSITION AND A LUMINESCENT ADDITIVE ALLOWING THE IDENTIFICATION THEREOF

(71) Applicant: ANCOR TECNOLÓGICA CANARIA, S.L., Las Palmas de Gran Canaria (ES)

(72) Inventor: Noelia Beltrán Aznar, Las Palmas de Gran Canaria (ES)

(73) Assignee: ANCOR TECNOLÓGICA CANARIA, S.L., Las Palmas de Gran Canaria (ES)

( * ) Notice: Subject to any disclaimer, the term of this patent is extended or adjusted under 35 U.S.C. 154(b) by 202 days.

(21) Appl. No.: 18/838,416

(22) PCT Filed: Feb. 21, 2023

(86) PCT No.: PCT/ES2023/070095

§ 371 (c)(1),
(2) Date: Aug. 14, 2024

(87) PCT Pub. No.: WO2023/161546

PCT Pub. Date: Aug. 31, 2023

(65) Prior Publication Data

US 2025/0154613 A1 May 15, 2025

(30) Foreign Application Priority Data

Feb. 23, 2022 (ES) .................................. 202230146

(51) Int. Cl.

| | |
|---|---|
| ***C14C 3/30*** | (2006.01) |
| ***A01N 59/26*** | (2006.01) |
| ***A01P 1/00*** | (2006.01) |
| ***C14C 3/06*** | (2006.01) |
| ***C14C 11/00*** | (2006.01) |

(52) U.S. Cl.

CPC ................ *C14C 3/30* (2013.01); *A01N 59/26* (2013.01); *A01P 1/00* (2021.08); *C14C 3/06* (2013.01); *C14C 11/003* (2013.01)

(58) Field of Classification Search

CPC . C14C 3/30; C14C 3/06; C14C 11/003; A01P 1/00; A01N 59/26

USPC .......................................................... 8/94.26

See application file for complete search history.

(56) References Cited

U.S. PATENT DOCUMENTS

| | | | | |
|---|---|---|---|---|
| 4,484,925 A * | 11/1984 | Roux | ........................ | C14C 3/04 8/94.2 |
| 2005/0178841 A1 | 8/2005 | Jones, II et al. | | |
| 2019/0249360 A1 * | 8/2019 | Zugno | .................... | G01N 21/77 |

FOREIGN PATENT DOCUMENTS

| | | |
|---|---|---|
| CN | 101263941 A | 9/2008 |
| CN | 105234388 A | 1/2016 |
| CN | 107354251 A | 11/2017 |
| CN | 111296430 A | 6/2020 |
| CN | 111700080 A | 9/2020 |
| CN | 113712028 A | 11/2021 |
| WO | 9821569 A1 | 5/1998 |
| WO | 2008093353 A1 | 8/2008 |

OTHER PUBLICATIONS

International Search Report for Corresponding International Application No. PCT/ES2023/070095, 9 pages, Jun. 2, 2023, with English Translation.

* cited by examiner

*Primary Examiner* — Amina S Khan
(74) *Attorney, Agent, or Firm* — LUCAS & MERCANTI, LLP

(57) ABSTRACT

A method for antimicrobial protection applied to hides in the tanning process incorporating a biocidal composition and an additive allowing the identification by a luminescent effect, and using luminescence encryption techniques, wherein the composition is added in the tanning process immediately after adding the chromium or titanium salts in an amount between 0.1% and 5% by weight of the material to be tanned and comprises: silver phosphate glass; silicone; aliphatic hydrocarbons; and water, and the luminescent additive is added in an amount between 0.1% and 5% by weight of the material to be tanned and comprises silica; alumina; calcium fluoride; erbium (III) fluoride; ytterbium (III) fluoride; thulium (III) fluoride; and europium (III) fluoride.

2 Claims, No Drawings

METHOD FOR THE ANTIMICROBIAL PROTECTION OF HIDES DURING THE TANNING PROCESS WHICH INCLUDES A BIOCIDAL COMPOSITION AND A LUMINESCENT ADDITIVE ALLOWING THE IDENTIFICATION THEREOF

CROSS-REFERENCE TO RELATED APPLICATION

This application is a 371 of PCT/ES2023/070095, filed Feb. 21, 2023, which claims the benefit of priority from Spanish Patent Application No. P202230146, filed Feb. 23, 2022, the contents of each of which are incorporated herein by reference.

OBJECT OF THE INVENTION

The present invention discloses a method for antimicrobial protection applied to hides in the tanning process that incorporates a biocidal composition and an additive that allows the identification of its presence through a luminescent effect, such that it guarantees that the hide has been previously treated with said biocidal product, giving reassurance to the user and ensuring that the product is present, as well as certifying its originality using luminescence encryption techniques.

BACKGROUND OF THE INVENTION

The skin of certain animals would be a waste product if it were not reused by tanneries, since it would enter a state of decomposition and become another waste to be eliminated. Through the tanning process, skin decomposition stops. The animal's skin gains resistance, elasticity and softness, characteristics that facilitate the subsequent preparation thereof. Therefore, hide becomes an extremely flexible material, which can be used for different applications: from suitcases to shoes, from belts to jewellery, but also leather sofas and armchairs, cell phone and tablet cases, clothes and coats, among other objects. Thanks to some modifications in the production process, it is possible to obtain certain characteristics that are better suited to certain uses: the final result will be hides that are more or less soft and malleable, or particular chromatic hues.

In the hide tanning process, two methods are fundamentally used: one based on chromium salts and another based on vegetable agents. 80% of industries dedicated to leather tanning use the process based on chromium salts.

Tannin is able to bind to proteins in a stable manner: once the tanning process is finished, tannin remains permanently adhered within the fibres of the hides. This is a very important detail because the tannin gives the hides absorbent and breathable properties.

In the tanning process, animal collagen, which represents the main component of the skin, is modified so that the hide resulting from tanning exhibits resistance to heat and microorganisms, as well as that after drying, it retains the flexibility of tanned leather. Essentially three tanning methods are applied today, which are based on respectively different cross-linking strategies:

Mineral tanning with metallic salts (e.g. chromium salts, titanium, iron, aluminium, zirconium). The stabilisation consequently leads to the state that the metal ions are bound in the form of a complex or by means of ionic interactions by the amino acid chains to the collagen peptide backbone.

Vegetable tanning with plant extracts (e.g. mimosa, quebracho, chestnut and tara). Stabilisation is mainly based on hydrogen bonding between the tanning phenols and the peptide bonds in the collagen backbone.

Synthetic tanning with reactive organic compounds (especially with aldehydes, such as for example. glutardialdehyde, isocyanates). Stabilisation is mainly carried out by covalent bonding of the lysine residues of collagen.

The chrome tanning method, with a global proportion of over 90%, is the most widely used worldwide. Hydrated chromium complexes, which are arranged between the carboxyl groups of glutamic acid and aspartic acid of the collagen peptide backbone, result in hides that are resistant and soft. In addition to the good quality of the hides to be obtained, with chrome tanning, rapid and economical process management has been established.

The chromium salts-based tanning process is the most used, but the most polluting due to the toxic effect of Cr. This method allows the skin's collagen to be stabilised using mineral tanning agents, transforming the skin into hides. In mineral tanning, different types of chromium salts are used in very varying proportions. Before entering the tanning process, the skin is drained to eliminate as much moisture content as possible. To carry out this process, the skin is introduced into a machine called a divider. The action of trivalent chromium in an acidic medium (hydrochloric acid), allows turning skin into hides (stable material), preventing its degradation. The duration of the tanning process is 8 to 24 hours. The chromium that is not absorbed by the hides is reused. Once the hides are dry, they are subjected to various softening processes, resulting in products, in combination with mechanical processes, cause the hides to be more durable and resistant.

Conventionally, when raw skins are tanned to produce hides, biocidal preparations are added to the tanning drum to prevent deterioration of the hides during storage and transportation, this is done through a batch process, however, this process does not ensure that the treated skins can remain protected for much longer than that associated with transportation, on the other hand, to certify that a biocidal agent, such as a fungicide, has been applied to a hide piece, the hide piece must be removed from the drum and analysed with reagents. This is a laborious and specialised test that only a few tanneries perform. Once the hides are stored, the determination of whether a biocidal agent has been applied is only available through extraction and high-performance liquid chromatography (HPLC) analysis which requires sophisticated equipment, is expensive and time-consuming.

However, during any of the leather tanning processes, there is no associated process that allows the leather resulting from said tanning to be protected against microbial pathogens that are present on the surface for an indefinite time. Therefore, there is a need in the tanning process for an associated step that protects the leather and blocks the transmission of diseases caused by microbial pathogens beyond the leather storage period. Furthermore, there is a need for a method that is easier, faster and less expensive to determine if a biocidal agent has been applied to a hide piece and, optionally, that this leather remains protected for a long time.

American patent application US20190249360 from the state of the art discloses a method and system for marking hides or leather treated with biocidal agent and the identification thereof, wherein said method is carried out by applying a biocidal agent and one or more detectable tags to a hide or leather piece. The detectable tag(s) may be detected to indicate one or more pieces of data, such as whether the biocidal agent has been applied to the hide or leather piece and/or other data. Information about the biocidal agent and the tannery that applied the biocidal agent or other data can be discerned from the detection of the detectable tag or one or more of the detectable tags, if they were used. Also provided is a system for marking hides or leather and applying a biocidal agent, as well as methods and systems to detect marks. The method comprises: applying a biocidal agent to a hide or leather piece; and applying one or more detectable tags to the hide or leather piece, wherein the one or more detectable tags convey a) whether the biocidal agent has been applied, and/or b) the tannery where the biocidal agent was applied, and/or c) what type of biocidal agent has been applied, and/or d) the supplier or supplier of the biocidal agent, and/or e) when the biocidal agent was applied, and/or f) whether sufficient biocidal agent has been applied (concentration) and/or g) whether the biocidal agent has been uniformly applied on the hides or leather or any combination thereof.

The present invention discloses a method for the antimicrobial protection of hides during the tanning process, where the transformation of skin into hides is used, which is verified in the presence of Cr (III) and/or Ti (IV) salts, so that by adding controlled amounts of a biocidal composition, to equip hides with antimicrobial (antibacterial and antivirus) characteristics that prolong the useful life of the material and improve the performance of the articles manufactured therewith. Furthermore, the biocidal composition incorporates a luminescent additive in the tanning process that allows proving that the piece has been treated with the original biocidal product and that it is free from microbes, pathogens, viruses, etc.

PREFERRED EMBODIMENT OF THE INVENTION

The present invention discloses a method for the antimicrobial protection of hides during the tanning process which includes a biocidal composition and a luminescent additive that allows the identification and authentication thereof.

The tanning step in leather treatment is based on the reaction of the leather's collagen with metal cations. When the cation used is Cr (III), the tanning process is called "wet blue". When Ti (IV) is used, the tanning process is called "wet white".

Most of the chromium or titanium in hides binds strongly to collagen during tanning. This phenomenon is the reason for selecting both elements in the process. Once the chromium or titanium is fixed to the fibre, in the case of chrome, the availability thereof for the balance of Cr (III) and Cr (VI) is drastically reduced. Only the extractable part of Cr (III) in the hides is completely available for balance. It is only at temperatures equal to or greater than 800° C. that the oxidation reaction begins to turn towards Cr (VI). This does not represent any type of risk in normal hide conditions.

The high thermal stability of chrome tanned hides is justified by accepting that bonds are formed, containing chromium atoms between neighbouring protein chains. This greater cross-linking of the protein chains increases the stability thereof both against heat, as in relation to its swelling or even with respect to a possible hydrolysis. Nowadays it is accepted, as the main mechanism of chrome tanning, that chromium aggregates form bonds between protein chains. Nevertheless, a part of the fixed chromium is bound to other chromium atoms by ollification or oxalation, or through hydrogen bonds to other collagen reactive groups. It seems very likely that less than half of the available carboxylic groups would have reacted with chromium salts during normal tanning.

The process consists of introducing solid chromium salts into the drum, where the pickling skins are located and let them roll for a specific time so that they dissolve and then add the basifying products in a solid state and at once or in doses. Although freshly dissolved chromium salts are masked with sulphate and are poorly sensitive to alkalis, there are molecules that are strongly basified. An important property of basic chromium salts is their ease for bonding, because the $OH^-$ groups bound to chromium tend to form bonds between chromium atoms and skin collagen. In the case of a very high basicity, which occurs when the external $OH^-$ groups bind to chromium atoms, two, at most three bonds are formed between the $OH^-$ groups of the macromolecule for each chromium atom present. The greater the number of $OH^-$ groups that act by forming these bonds between two chromium atoms, the greater the stability that the used chromium salts will have and the greater the resistance to acids.

The biocidal composition of the invention is added immediately after adding the chromium or titanium salts in the tanning process and incorporates a source of silver ions preferably formed by silver phosphate glass which are partially soluble materials, being able to act as a unique system for the supply of silver ions in a controlled manner. This allows acting on the antimicrobial capacity in the tanning process. Silver ions from silver phosphate glass can coordinate with $OH^-$ groups linked to chromium that tend to form bonds between chromium atoms and skin collagen, such that combined they show a synergistic action with effectiveness against all gram-positive and gram-negative bacteria. This fact, in addition to increasing the bactericidal power of the hides treated in the process, allows greater stability of the bond between skin collagen and the chromium salts. The action mechanisms of silver when coordinated with the chromium salts bound to skin collagen work in unison to reduce the risk of infection through the silver concentration-dependent effect, being effective against growing and quiescent cells through multiple targets in the cellular structure, and the time-dependent effect of silver, which is effective against growing cells through a single target on the cell.

The biocidal composition for its action in the tanning process comprises silver phosphate glass between 3% and 5%. silicone in an amount between 1% and 3.5%; aliphatic hydrocarbons between 0.1% and 0.30%; and water between 90% and 95%. This composition is added in the tanning process in an amount between 0.1% and 5% by weight of the material to be tanned. The biocidal composition provides silver ions in sufficient amount so as to maintain the biocidal effect of the Ag (+) ions throughout the useful life of the material.

The amount of said composition to be used will vary depending on the type of process. It is estimated that between 0.5% and 1.0%, always referring to the weight of hides to be treated in each process, is sufficient for the composition to fulfil its antimicrobial function.

In the tanning process, a luminescent additive is incorporated to indicate that the skin has been previously treated with the biocidal composition. The incorporation into the biocidal composition of a luminescent additive formed by metal oxides (aluminosilicate glass containing rare earth ions by way of dopants) allows a coating of said composition to be detected and identified by means of infrared light that induces an easily detectable luminescence (green light). This luminous additive presents an encodable emitted light pattern that allows the compound to be unforgeably identified, certifying the authenticity thereof, which distinguish the same with respect to other similar products on the market.

The luminescent additive that acts as a marker allowing the identification of the biocidal composition is composed of between 20% and 40% silica in combination with alumina in a proportion between 10% and 30% and calcium fluoride between 30% and 50% by weight. Materials doped with luminescent "rare earth" ions are added to this mixture, such as erbium (III) fluoride between 0.5% and 3%; ytterbium (III) fluoride between 5% and 15%; thulium (III) fluoride in a maximum amount of 5%; and europium (III) fluoride in a maximum amount of 5%. All these percentages are referred to the total weight of the luminescent additive.

Silica is used as cold light coating, i.e., they do not involve heat production, being particularly useful in the main physical phenomena that allow the production of light with characteristics such as phosphorescence and fluorescence. Furthermore, it is used as an insulating coating, forming a thin layer on the application surface similar to a laminate, protecting and preserving a surface from the action of water, from scratches or other abrasion damage. Alumina acts as a selective adsorbent allowing the level of fluoride in the mixture to be adjusted downward.

Calcium fluoride significantly increases its fluorescence with broad emission that appears within the range of acceptable targets. The optically active compounds of the additive are formed by luminescent "rare earth" ions. Ytterbium fluoride increases the absorption of infrared light and subsequent conversion to visible light by means of the remaining luminescent elements in the marker composition (erbium, thulium and europium fluorides). Erbium-doped silica glass fibres are the active element to amplify the luminescent effect, in addition, its homogenisation increases due to the presence of alumina. Ytterbium fluoride also increases the amplification of the material as a luminescent marker and thulium (III) fluoride is used to improve up-conversion fluorescence from infrared to ultraviolet and visible in fluorinated glasses. Europium fluorescence is used to improve the emitted colour encoding effect of the marker additive.

The luminescent additive that acts as an identification marker of the biocidal composition is applied between 0.1% and 5% by weight of the treated material during the tanning process.

This luminescent additive, only visible under IR excitation, is formulated to be integrated into the formulations of the treated materials and act as a marker, when irradiated by IR light, in the range of 900 to 990 nanometres.

The different tests have determined that the luminescent additive of the product presents emission only under invisible infrared light with a high intensity brightness, due to the lack of background noise due to the zero autofluorescence of the textile substrate or the surface where it has been applied. Additionally, the luminescence intensity ratios between the different visible emission bands (blue, green and red) observed after the conversion of the invisible infrared reading light, can be tuned on demand (by modifying the concentration level and type of dopant "rare earth" ions). In other words, encoding the emitted light using an unforgeable code, by being designed and synthesised on demand at source, providing a novel and disruptive proof of concept for light encryption security patterns.

The tests applied to the results obtained in the tanning process are:

- ASTM E2149-20: Standard test method for the determination of the activity of immobilised antimicrobial agents under dynamic contact conditions.
- UNE-EN ISO 18184—Test methods for the determination of the antiviral activity of products against specific viruses.

A biocidal surface protection of between 12 and 18 months has been determined, so it allows keeping hard, non-porous surfaces protected for a long time with a single application. The product is effective for the biocidal protection of hides during the process of transformation of the skin into hides against various microorganisms such as *Escherichia coli, Staphylococcus aureus, Enterococcus hirae, Pseudomonas aeruginosa, Candida albicans*, as well as certain types of viruses with and without an external shell.

As an added value, the luminescent feature thereof clearly distinguishes the present invention with respect to the state of the art, since it allows the user to visualise where the product has been applied and recognise an encoded light pattern to demonstrate that the product is original. A simple and compact portable handheld device (pocket spectrometer/App for a smartphone camera) will allow the end user to detect the encoded luminescent pattern by illuminating with a low-cost commercial infrared laser pointer, and therefore to verify that the applied product is protected with the original biocidal composition. This luminescence technology with infrared light and colour encoding using "rare earth" ions is at the forefront of anti-counterfeiting light technology, in the line of techniques used in the authentication of documents (passports, security inks) and in security encryption for legal tender banknotes. Therefore, its use in the original identification of the biocidal product constitutes without a doubt an absolute novelty that defines a clear substantial difference with other products having similar features on the market.

The invention claimed is:

1. A method for the antimicrobial protection of hides during the tanning process which includes a biocidal composition and a luminescent additive that allows the identification thereof, comprising:

adding a composition in the tanning process of a material to be tanned immediately after adding chromium or titanium salts in an amount between 0.1% and 5% by weight of the material to be tanned, wherein the composition comprises: silver phosphate glass between 3% and 5%; silicone in an amount between 1% and 3.5%; aliphatic hydrocarbons between 0.1% and 0.30%; and water between 90% and 95%, adding a luminescent additive in an amount between 0.1% and 5% by weight of the material to be tanned, wherein the luminescent additive comprises between 20% and 40% silica; alumina in a proportion between 10% and 30%; calcium fluoride between 30% and 50%; erbium (III) fluoride between 0.5% and 3%; ytterbium (III) fluoride between 5% and 15%; thulium (III) fluoride in a maximum amount of 5%; and europium (III) fluoride in a maximum amount of 5%, with respect to the total weight of the luminescent additive.

2. The method for the antimicrobial protection of hides during the tanning process which includes a biocidal composition and a luminescent additive that allows the identification and authentication thereof, according to claim 1 wherein the luminescent additive acts as a marker, when irradiated by IR light, in the range of 900 to 990 nanometres.

* * * * *